US006189466B1

(12) United States Patent
Sinclair et al.

(10) Patent No.: US 6,189,466 B1
(45) Date of Patent: Feb. 20, 2001

(54) NOXIOUS WEED CONTROL BY SOIL SOLARIZATION

(75) Inventors: Thomas R. Sinclair; Carlene A. Chase, both of Gainesville; Daniel O. Chellemi, Vero Beach, all of FL (US); Frank Fornari, West Monroe, LA (US)

(73) Assignees: The United States of America as represented by the Secretery of Agriculture, Washington, DC (US); University of Florida, Gainesville, FL (US)

( * ) Notice: Under 35 U.S.C. 154(b), the term of this patent shall be extended for 0 days.

(21) Appl. No.: 09/006,562

(22) Filed: Jan. 13, 1998

(51) Int. Cl.[7] .................................................. A01C 11/00
(52) U.S. Cl. .......................... 111/102; 111/900; 111/200; 47/9
(58) Field of Search .................... 47/9, 25; 111/200, 111/199, 900, 915, 919, 100, 102

(56) References Cited

U.S. PATENT DOCUMENTS

| | | | |
|---|---|---|---|
| 3,810,328 | * | 5/1974 | Bryan, Jr. et al. ......................... 47/9 |
| 3,857,804 | * | 12/1974 | Glatti et al. ................................ 47/9 |
| 3,870,583 | * | 3/1975 | Gidge ..................................... 47/9 X |
| 4,266,370 | * | 5/1981 | Kodera et al. .......................... 47/9 X |
| 4,481,254 | * | 11/1984 | Fukushima et al. .................... 47/9 X |
| 4,920,692 | * | 5/1990 | Kitamura et al. ........................... 47/9 |
| 5,262,233 | * | 11/1993 | Sudo et al. ............................ 47/29 X |
| 5,509,231 | * | 4/1996 | Marcoux ................................ 47/9 X |
| 5,729,929 | * | 3/1998 | Burke ......................................... 47/9 |
| 5,767,179 | * | 6/1998 | Takado .................................. 47/9 X |

OTHER PUBLICATIONS

Chase et al., Proceedings, Southern Weed Society, pp. 82–83, 1997.
Chase et al., Proc. Fla. St. Hort. Soc., Paper No. 139, 1997.

* cited by examiner

*Primary Examiner*—Victor Batson
(74) *Attorney, Agent, or Firm*—M. Howard Silverstein; John D. Fado; G. Byron Stover

(57) ABSTRACT

A method of controlling noxious weeds, particularly nutsedge (Cyperus spp) by soil solarization, comprising covering the soil with an effective thickness of a transparent, thermoplastic IR retentive film for a sufficient period of time to either kill or suppress the weeds. Also a field management method for the growing of cash crops susceptible to interference by noxious weeds comprising the steps of forming planting beds of soil; subjecting the soil to soil solarization; painting the film to terminate the solarization period; and transplanting cash crop.

4 Claims, 1 Drawing Sheet

NOXIOUS WEED CONTROL BY SOIL SOLARIZATION

FIELD OF THE INVENTION

This invention relates to weed control by means of soil coverage with plastics film and, particularly, control of nutsedge (Cyperus spp) by said means.

BACKGROUND TO THE INVENTION

Soil solarization is a hydrothermal process that utilizes the sun's energy to heat moist soil that is mulched under polyethylene. The basic concept of soil solarization is to use clear plastic films to allow transmission of light energy to the soil, where it is absorbed and used to heat the soil. The clear plastic film decreases convective heat loss so that increased soil temperatures are achieved. If the temperature under the plastic film and in the soil reaches sufficiently high temperatures, weeds and other plant pests are damaged or killed. Consequently, the need for chemical pesticides, or the amount of pesticide, is decreased by using soil solarization. Accordingly, in arid cloud-free regions, the soil solarization technique has found wide application for the control of some soil-borne diseases and weeds.

Thus, in high light, cloud-free climates soil solarization with clear polyethylene films has been used successfully. However, in more humid environments, where clouds are a common occurrence, soil solarization is of less value in not providing the desired temperature. Further, one of the large losses of energy from the soil during solariation is as thermal-infrared radiation from the soil back through the film.

Thus, under a consistent cloudy environment, prior art soil solarization methods are less efficacious, particularly against certain noxious weeds, such as yellow and purple nutsedge (Cyperus spp). There is, therefore, a need for an improved method of weed control involving a more efficacious solarization technique and/or plastics film of use therein.

SUMMARY OF THE INVENTION

It is an object of the present invention to provide an improved soil solarization method that uses a thermal-infrared absorbing film for the control of noxious weeds, particularly, nutsedge.

It is a further object of the invention to provide an improved field management method for the control of noxious weeds.

Soil solarization involves the laying of a film of a suitable plastics material on soil to be heated by solar radiation for insect, pathogen and weed control prior to the transplanting of a fruit or vegetable cash crop in the soil.

Accordingly, in one aspect the invention provides a method of controlling noxious weeds by soil solarization of soil, said method comprising covering said soil with an effective thickness of a transparent, thermoplastic IR retentive film for a sufficient period of time to either kill or suppress said weeds.

By the term "transparent" in this specification is meant a film that allows visible light and short-wave infrared transmission, therethrough; and by the term "IR retentive" is meant film that blocks the transmission of medium and long-wave infra-red radiation (6–25 micrometers wavelength) therethrough. The transmittance of the film was determined by the ASTM D1003 Test Method.

The present invention in one aspect, therefore, provides for the use of suitable clear (transparent) IR retentive film that has an enhanced absorption of thermal-infrared radiation property and, thus, traps more heat and increases the temperature of the soil relative to that which is otherwise achieved by prior art films, by reducing heat loss from the soil. We have found that enhanced soil temperatures using IR retentive film relative to soil temperatures resulting from clear polyethylene mulches in the method of the present invention have been effective in controlling weeds in the cloudy environment of Florida during the summer months.

We have surprisingly discovered that in the practice of the invention, nutsedge growth is advantageously controlled both by the prevention of germination in the top soil layers and by the "burning" of the newly formed tender growth, due to the accumulated high temperature build-up at the soil surface under the IR retentive film of use in the practice of the invention. We have also found that increased temperatures deeper in the soil under the IR retentive film stimulated germination in these deeper soil layers. Subsequently, this new growth is burned when it grows into the lethal temperatures at the soil surface.

We have found that the high light transmission of the film of use in the invention as defined, preferably, aided by the antifog properties conferred by an antifog additive, warmed the soil and encouraged the nutsedge to sprout and initiate growth. This was followed by "burning" of the tender shoot by the accumulated high temperature and direct light under the IR retention effect of the film. Neither black plastic film nor clear, regular (i.e. none-IR retentive additive) plastic has the heat build-up performance to the extent offered by the IR retentive thermal films to "burn" the nutsedge.

The films may inherently possess the desired degree of IR retentiveness, such as is the case for EVA copolymer films; or the IR retentiveness may be provided by the addition of IR absorbing fillers, such as, for example, silica, aluminum trihydrate, aluminum borate, calcium borate, magnesium borate, zinc borate, anhydrous borax, talc, alunite, and calcium carbonate. The thickness of the film and the amount of IR absorbing filler contained within the film for use in the invention method may be readily determined.

Preferred films of use in the practice of the invention are those having the desired high light transmission and infrared heat retention, and, for example, comprise LDPE, LLDPE or EVA copolymers or mixtures thereof; such as DURA-THERM (Trade mark of AT Plastics Inc.) LDPE/LLDPE mixtures and having IR fillers to retain IR radiation of the range 7–25 mm; and 5–28% w/w VA (vinyl acetate) EVA copolymers.

The invention is thus also of value with films formed of polymers having sufficient intrinsic IR absorbing values at practical gauges without the need for an IR absorbing filler. Examples of such polymers, include, but are not limited to ethylene vinyl acetate (EVA), poly vinyl chloride (PVC); poly vinyl di-chloride, (PVDC); poly vinylidene di-fluoride (PVDF); and thermoplastic urethane (TPU). Thus, unlike those polymeric films which have lower intrinsic IR retention and require an IR additive at the film gauges of practical use, these EVA and the like polymers may be used without an IR filler, although an antifog agent and other additives are still preferably present.

For guidance, films having gauges selected from 1–10 mil and formed of polymers providing at least 30%, preferably more than 50% IR retention of radiation in the range 6 mm–25 mm, than does LDPE film of the same gauge and not containing an IR absorbing filler, are preferred in the practice of the invention in controlling nutsedge.

The practice of the present invention is of particular value in the production of cash crops, particularly, strawberries or tomatoes through weed control, under a hot, cloudy environment.

The nature of the IR film of use in the practice of the invention may be suitably selected by the skilled artisan based on desired properties, such as transparency, IR retention, weight, ease of manufacture, durability resistance to sunlight and the like. The transparency and the IR retentive nature of a suitable film can be readily determined by the skilled artisan for use in the present invention following the surprising discovery that such films have the desired efficacy in controlling by killing or suppressing weeds such as nutsedge.

Preferably, the film is formed of at least one polyolefin. By the term "polyolefin" as used in this specification is meant the polyethylene, polypropylene and polybutadiene family of olefine polymers and copolymers. As examples, high density, low density and linear low density polyethylenes and 1,2-polybutadienes may be mentioned. The term "polyethylene" includes ethylene homopolymers, and copolymers of, such as vinyl acetate, acrylic acid, methyl methacrylate, butene, n-hexene, 4-methyl-1-pentene and octene polymers with ethylene and blends thereof.

A multilayered film of use in the practice of the invention may comprise (a) a plurality of distinct layers constituted as a plurality of distinct plies, (b) a laminate comprising at least two distinct films or plies adhered to each other, directly, or by means of an adhesive, (c) a co-extruded film produced by the self-adhesion of two or more films to each other under hot process conditions or (d) a co-oriented film, laminate or ply made by the cold drawing of a plurality of thermoplastic films, simultaneously in such close contact together that under the drawing step at the drawing temperature the films become intimately associated and unified into a single resultant film or ply while each undivided film is being uni-axially oriented.

The coextruded film of use in the invention may comprise two or more layers.

Preferred multilayer films of use in the practice of the invention comprise a film as hereinbefore defined to which an antifog surfactant had been added so as to develop the antifog nature of the surface.

The film may be, preferably, further stabilized for multi-year service life. Stabilization additives, include, for example, antioxidants, UV stabilizers, UV absorbers and chelating agents in the quantities required for their specific application as would be readily recognized and determined by those skilled in the art.

In addition, coextruded film may contain additives to give further light diffusion, alteration of sunlight spectrum and barrier properties.

Preferably, the film comprises a low density linear polyethylene.

In a further aspect, the invention provides a field management method for the growing of cash crops susceptible to interference by noxious weeds, said method comprising the steps of
(i) forming planting beds of soil;
(ii) subjecting said soil to soil solarization as hereinabove defined;
(iii) painting said film to terminate solarization period; and
(iv) transplanting said cash crop.

Preferably, the method as hereinbefore defined further comprises
(v) subjecting said soil according to step (ii) for a period selected from 6–8 weeks; and
(vi) painting said film after step (ii) with a paint to prevent visible light transmission for a period of at least 3 hours, prior to step (iv).

For a more complete understanding of the nature and further objects of the present invention, reference is made to the following description thereof.

BRIEF DESCRIPTION OF THE DRAWINGS

In order that the invention may be better understood, preferred embodiments will now be described by way of example only, with reference to the accompanying drawings, wherein.

DETAILED DESCRIPTION OF PREFERRED EMBODIMENTS

Figure 1:
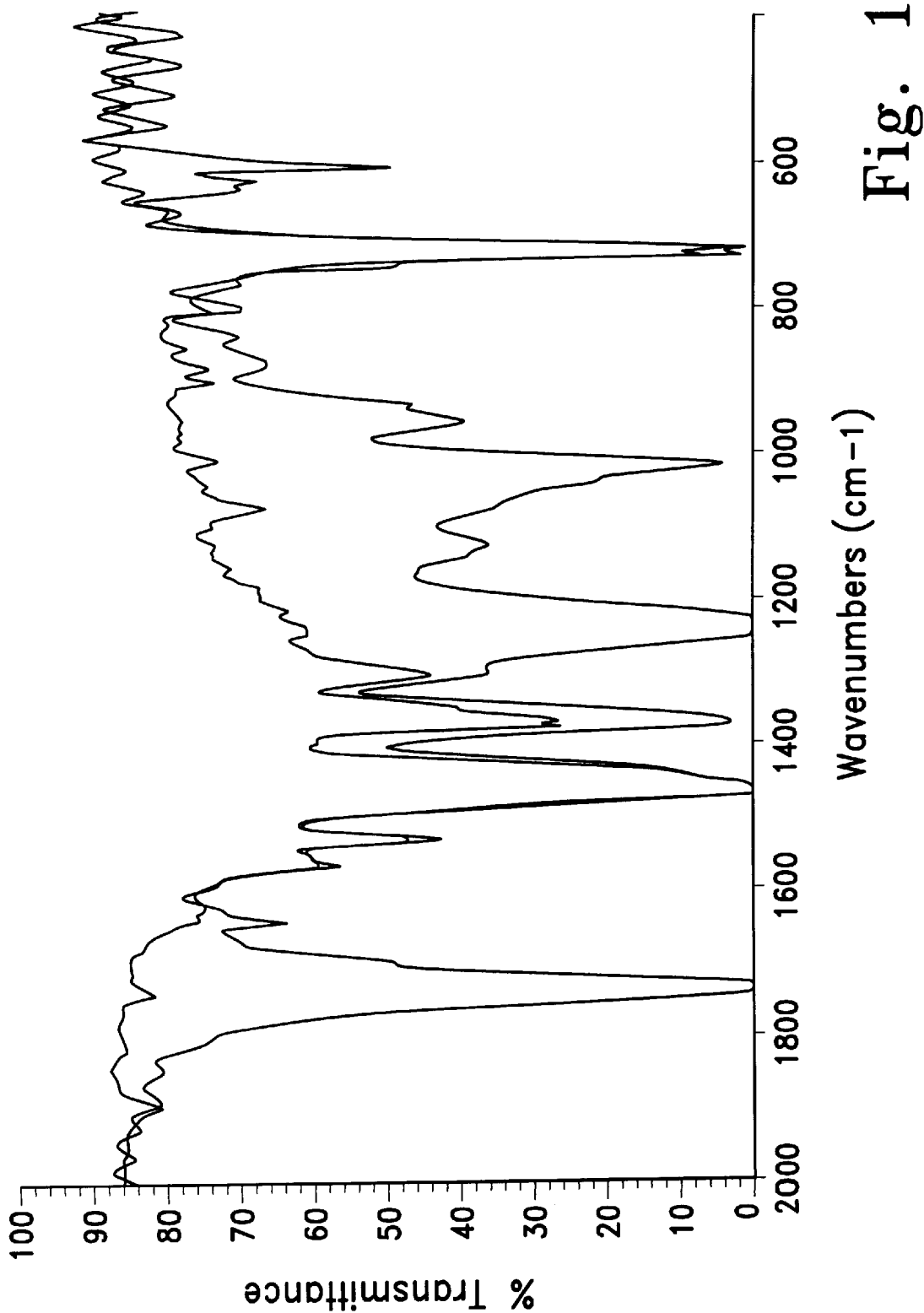
FIG. 1 represents an IR transmission/absorption spectrum, over the range 500–1900 wave numbers.

Field Management Process in a Cloudy Environment

Field Preparation.

This is similar to that currently used in vegetable production in that planting beds of usually about 20 cm tall and approximately 1 m wide are formed from the soil. However, in the practice of one aspect of the present invention, the beds are formed a significant number of weeks before the conventional time of planting bed installation, to provide an efficacious period of soil solarization.

Three factors in the management of the method of the invention of soil solarization have been identified.

(1) In Florida, the planting beds to be soil solarized are preferably installed about 6–8 weeks before transplanting the crop.
(2) The soil needs to be in a reasonably moist condition in that not only is the moisture important in forming the planting beds, but it facilitates the storage of heat energy in the soil. In addition, moisture usually causes quiescent organisms or tissues to be more susceptible to heat damage.
(3) Preliminary tests indicated that orienting the beds in a north-south direction resulted in more uniform soil heating than east-west beds.

Installation.

Installation of the thermal-infrared absorbing film [TIAF] of use in the practice of the invention can be done by using conventional equipment for laying plastic mulch on vegetable planting beds. Shortly after forming the planting beds, the film is laid to cover the transplanting beds at a width preferably selected from 1.5 to 1.8 m, to allow complete coverage of the bed and burial of the edges of the film next to the bed with soil. The film should fit snugly over the soil bed.

Preparation for vegetable transplantation.

Following six to eight weeks of solarization, the film is, preferably, painted to block light penetration through the mulch in advance of transplanting vegetable plants. This is desirable to obtain soil temperatures that do not damage the transplants and to decrease light available for any subsequent weed growth. White and black paints have been successfully used in painting the TIAF. The painting is accomplished by direct application of the paint with equipment used to apply liquid pesticides to crops. The coverage of paint is preferably sufficient to decrease light transmission to the soil to a low level. Subsequently, transplantation of vegetable plants into the mulch can be done using conventional approaches within only a few hours after painting the TIAF.

EXAMPLES AND RESULTS

With reference to FIG. 1, the relative degree of IR absorption (retention) is measured by comparing the areas under the transmission spectra over the two wavelength-regions, 7–14 mm (1450 cm$^{-1}$–700 cm$^{-1}$) and also by the winder range 6–25 mm (1700 cm$^{-1}$–400 cm$^{-1}$. The percentage of area is the integrated area between the transmission curve and base line and between the specific frequencies (or wavelengths) compared to complete transmission, which area is taken as 100%. Larger values mean greater transmission. Smaller values mean greater IR retention. The IR transmission curve is developed by a dispersive IR instrument or an FTIR instrument which also integrates the area under the specific portions of the curve. Alternately, if a particular instrument is not equipped for integration of the area under the curve the same may be accomplished manually in the traditional way of totalling column heights of stated interval widths. Polyethylene films with an IR absorbing filler additive have higher radiation transmission in the aforesaid regions, while reduced transmission indicates increased IR retention. The extent of IR retention is a combination of the intrinsic IR absorption of a polymer per se, the amount of IR filler, (if any), and the film gauge. In the comparative FTIR transmission curves of FIG. 1, the higher curve shows allowance of more infra-red radiation, i.e. less IR retention, while the lower curve shows allowance of less infra-red radiation, i.e. more IR retention.

Table 1 gives comparative data of transmission values of several films as measured by the area under the curve.

TABLE 1

| Sample | Gauge (mil) | Transmission - area under the curve | |
|---|---|---|---|
| | | 1700–400 cm$^{-1}$ | 1450–700 cm$^{-1}$ |
| No film | — | 100% | 100% |
| LDPE/LLDPE | 4.1 | 70.6 | 66.5 |
| 12% va EVA | 3.0 | 52.7 | 40.4 |
| 12% va EVA | 4.3 | 44.6 | 32.8 |
| EVA + SiO$_2$ filler | 4.3 | 31.0 | 24.8 |

Solarization trials were conducted at Quincy (north Florida), Gainesville (north-central Florida) and Bradenton (central Florida, Gulf coast) in summer, and at Gainesville and Bradenton in winter. The soil types at the three sites are Orangeburg fine sandy loam (fine loamy, siliceous, thermic, Typic Paleudults), Arredondo fine sand (loamy, siliceous, hyperthermic, Grossarenic Paleudults) and EauGallie fine sand (siliceous, hyperthermic, alfic, Haplaquod), respectively.

Soil temperatures were measured using CR10 dataloggers (Campbell Scientific, Logan, Utah) outfitted with thermocouples that were inserted in the soil at the surface and at 5, 10 and 25 cm depths. Temperatures were recorded at 30 minute intervals, except at Quincy, where the 10 and 25 cm depths were measured hourly.

Test were conducted as follows at the stated test plots in Florida, with the results summarized in Tables 2–4.

Test 1—during springtime. At Gainesville, a 150 μm infrared-absorbing (IR) film and a combination of 150 μm IR and commercial bubble packaging film resulted in higher daily maximum and minimum soil temperatures than a low density 20 μM polyethylene film.

Test 2—during summer. A 30 μm low density clear polyethylene (LDPE) (AEP Industries, Hackensack, N.J.), a clear high density polyethylene (18.8 μM), a 100 μm IR LDPE/LLDPE/SiO$_2$ film, a commercial bubble film in combination with 30 μm clear LDPE, and a UV-stabilized bubble film were (Astro-Valcour Inc., Glen Falls, N.Y.) evaluated at three sites in Quincy, Gainvesville and Bradenton. A disparity in soil temperature observed in Test 1 did not occur in the Test 2 studies. The IR film resulted in the highest soil temperatures only at Bradenton. All of the clear films resulted in soil temperatures that were higher than those of soil mulched with the industry standard black and white mulches and nonmulched soil, at 5, 10 and 25 cm depths. Cooler soil surface temperatures were recorded with UV bubble film at Bradenton, and with a non-UV bubble film covered with the industry standard clear film at Gainesville. However, temperatures measured at 5, 10, 25 and 40 cm depths were comparable with the other solarization films.

Although solarization was interrupted by several rainfall events, there was complete control of all weed species studied except nutsedges. Nutsedge growth, however, was substantially suppressed because few nutsedge plants penetrated the solarization films, unlike the opaque films in methyl bromide-treated and control plots. Whereas nutsedge rhizomes penetrated the opaque mulches, the solarization films resulted in a morphological change from rhizome to shoot prior to contact with the film. Most of the emerged nutsedge plants in solarized plots were trapped under the film where a few consecutive days of high temperatures caused foliar scorching. At the end of the solarization period, after the films were painted white to reduce temperatures before tomato transplanting, nutsedge tubers that escaped lethal temperatures continued to sprout during the season. There was little penetration of the mulch. Nutsedge plants grew horizontally beneath the mulch. The combination of early control during the solarization period and the subsequent suppression of upright nutsedge growth resulted in tomato yields that were equivalent to the yields of the methyl bromide-chloropicrin treatments. Secure anchoring of the solarization film was shown to be highly desirable for suppressing nutsedge plants that sprouted post-solarization.

Some published reports have indicated difficulty in controlling purple (*C. rotundus*) and yellow (*C. esculentus*) nutsedges by solarization. The upper temperature threshold for sprouting of 44° C. has been recently published. From the temperatures recorded in these studies, only tubers located in the upper 10 cm of soil would have been directly killed by solarization. Also, alternating temperatures have also been previously shown to enhance sprouting of nutsedges. Accordingly, in order to suppress tubers that escape lethal temperatures, we have extended the solarization period to ensure sufficient alternating sprouting and foliar scorching to effect either tuber depletion or reduced tuber vigor.

We have determined in the laboratory, that 50° C. for 6 h per day will kill purple and yellow nutsedge (Cyperus spp.) tubers within a two week period. Although 45° C. delayed shoot emergence, it was not lethal to nutsedge tubers. In the field, during solarization, tubers that are located at depths that do not heat to lethal temperature, produce rhizomes that differentiate into shoots on detection of light as they emerge from the soil. The shoots are trapped under the tranparent solarization film and are killed by foliar scorching.

The highest soil temperatures were recorded at Quincy. The mean daily maximum temperatures at the soil surface were 61.5, 58.3, 60.5 and 59.3° C. for black, clear, IR and UV-bubble films, respectively. At 5 cm depth the mean daily maximum temperatures were 41.1, 46.9, 47.7 and 45.6° C., respectively. Under IR film, at 5 cm depth, there were 14 days with temperatures over 50° C. For clear and UV-bubble, there were only 9 and 8 days over 50° C., and temperatures were always below 50° C. for black film.

The lowest temperatures occurred at Bradenton, where subsurface irrigation was used through the solarization period. The black plastic mulch resulted in the lowest soil temperatures. The mean maximum temperatures under UV-bubble film at 5 and 10 cm were slightly higher than those under clear LDPE, but not at the surface where temperatures under the clear film was 2 degrees warmer. Higher soil temperatures were achieved under IR film than under the clear LDPE. Mean daily maximum temperatures at the soil surface and 5 cm were 58.4 and 49.3° C. for IR film, and 55.2 and 47.0 for clear LDPE film.

At Gainesville, IR and clear LDPE films gave similar soil temperatures except at the soil surface where IR had a mean daily maximum that was 2 degrees higher than the clear LDPE. The IR film also resulted in 14 days with maximum surface temperatures in excess of 60° C., compared with 6 days for the clear LDPE. The bubble film overlaid with clear LDPE resulted in lower maximum temperatures than clear LDPE by itself, but produced higher minimum soil temperatures. At all three locations, temperatures under the specialty films were sufficiently high to eliminate annual weeds and to suppress purple and yellow nutsedge. The thermal IR film, in particular, consistently gave higher temperatures than clear LDPE and provided enhanced weed control in Fall-produced vegetable crops.

The specialty films were also evaluated at Bradenton and Gainesville during the cool season. Infrared film (100 μm) was installed to give durations of 5, 7 and 9 weeks of solarization. UV-bubble was also installed for the 9 week duration only. At Gainesville, 50, 75 and 100 μm IR were installed and compared with UV-stabilized bubble film, black and a 19 μm clear high density polyethylene (HDPE) film, over an 8 week solarization period. The specialty films increased soil temperatures during winter solarization at both sides. However, temperature increases were not as pronounced in the winter as in the summer. There was only a limited amount of damage to emerged weeds. Emerged weeds included annuals such as goosegrass, crowfootgrass and pigweed and perennials such as nutsedge. In fact, the warmer temperatures of the solarization beds may have been advantageous for rapid weed growth. The results of winter solarization at two Florida sites were not encouraging for use of soil solarization for weed control in cool season crop production.

TABLE 2

Soil temperatures at Gainesville at various depths measured July 12–21 and July 31–August 12

| Film | Temperature | | | | | |
|---|---|---|---|---|---|---|
| | Max. | Mean Daily Max. | Min. | Mean daily Min. | Overall Mean | Days >50° C. (%) |
| 10 cm. | | | | | | |
| Black | 65 | 52 | 24 | 25 | 34 | 61 |
| Clear | 64 | 55 | 23 | 24 | 34 | 83 |
| IR | 65 | 57 | 24 | 25 | 36 | 83 |
| Clear/Bubble | 57 | 51 | 25 | 27 | 35 | 74 |
| 5 cm. | | | | | | |
| Black | 46 | 41 | 26 | 28 | 33 | 0 |
| Clear | 52 | 46 | 25 | 28 | 35 | 35 |
| IR | 52 | 47 | 27 | 29 | 36 | 39 |
| Clear/Bubble | 50 | 45 | 27 | 29 | 35 | 0 |
| 10 cm. | | | | | | |
| Black | 42 | 38 | 27 | 29 | 33 | 0 |
| Clear | 48 | 43 | 26 | 29 | 35 | 0 |
| IR | 49 | 44 | 28 | 30 | 36 | 0 |
| Clear/Bubble | 47 | 43 | 28 | 30 | 35 | 0 |
| 25 cm | | | | | | |
| Black | 38 | 35 | 28 | 31 | 33 | 0 |
| Clear | 41 | 37 | 28 | 31 | 34 | 0 |
| IR | 42 | 39 | 29 | 32 | 35 | 0 |
| Clear/Bubble | 41 | 38 | 29 | 31 | 34 | 0 |

TABLE 3

Soil temperatures at Quincy at various depths measured June 7–July 8

| Film | Temperature | | | | | |
|---|---|---|---|---|---|---|
| | Max. | Mean Daily Max. | Min. | Mean daily Min. | Overall Mean | Days >50° C. (%) |
| 10 cm. | | | | | | |
| Black | 70 | 62 | 17 | 22 | 35 | 88 |
| Clear | 68 | 58 | 18 | 22 | 34 | 81 |
| IR | 68 | 61 | 18 | 21 | 35 | 88 |
| UV-Bubble | 68 | 59 | 20 | 24 | 36 | 84 |
| 5 cm | | | | | | |
| Black | 46 | 41 | 23 | 26 | 33 | 0 |
| Clear | 54 | 47 | 22 | 26 | 34 | 28 |
| IR | 54 | 48 | 25 | 29 | 36 | 44 |
| UV-Bubble | 52 | 46 | 23 | 27 | 35 | 25 |
| 10 cm | | | | | | |
| Black | 44 | 39 | 24 | 27 | 32 | 0 |
| Clear | 46 | 40 | 25 | 29 | 34 | 0 |
| IR | 48 | 43 | 26 | 30 | 36 | 0 |
| UV-Bubble | 47 | 41 | 25 | 29 | 34 | 0 |
| 25 cm | | | | | | |
| Black | 38 | 34 | 25 | 29 | 31 | 0 |
| Clear | 40 | 35 | 26 | 31 | 33 | 0 |
| IR | 40 | 36 | 27 | 31 | 33 | 0 |
| UV-Bubble | 39 | 35 | 26 | 30 | 33 | 0 |

TABLE 4

Soil temperatures at Bradenton at various depths measured July 17–August 16

| Film | Temperature | | | | | |
|---|---|---|---|---|---|---|
| | Max. | Mean Daily Max. | Min. | Mean daily Min. | Overall Mean | Days >50° C. (%) |
| 10 cm. | | | | | | |
| Black | 59 | 49 | 23 | 26 | 35 | 42 |
| Clear | 60 | 55 | 23 | 26 | 36 | 90 |
| IR | 65 | 58 | 23 | 25 | 37 | 100 |
| UV-Bubble | 58 | 53 | 24 | 26 | 36 | 77 |
| 5 cm | | | | | | |
| Black | 46 | 42 | 25 | 28 | 34 | 0 |
| Clear | 51 | 47 | 26 | 28 | 35 | 16 |
| IR | 54 | 49 | 26 | 28 | 36 | 52 |

TABLE 4-continued

Soil temperatures at Bradenton at various depths measured July 17–August 16

| Film | Temperature | | | | | Days >50° C. (%) |
|---|---|---|---|---|---|---|
| | Max. | Mean Daily Max. | Min. | Mean daily Min. | Overall Mean | |
| UV-Bubble | 52 | 48 | 26 | 28 | 36 | 29 |
| | | | 10 cm | | | |
| Black | 43 | 39 | 27 | 29 | 33 | 0 |
| Clear | 47 | 43 | 27 | 29 | 35 | 0 |
| IR | 48 | 45 | 27 | 29 | 36 | 0 |
| Clear-Bubble | 48 | 44 | 27 | 29 | 35 | 0 |
| | | | 25 cm | | | |
| Black | 37 | 34 | 29 | 30 | 32 | 0 |
| Clear | 39 | 36 | 29 | 31 | 33 | 0 |
| IR | 39 | 37 | 29 | 31 | 34 | 0 |
| Clear/Bubble | 38 | 36 | 29 | 31 | 33 | 0 |

Thus, in summary, the important result is the unexpected significant increase in the number of days that the soil temperature exceeded 50° C. when IR retentive film was used in the solarization process.

Film with no antifog additive or coating allows water droplets to form, reduces the amount of sunlight transmitted to the soil and thereby lessens the temperature rise under the film. An antifog additive or coating causes the formation of sheeted water on the film to contribute to IR retention as compared to water droplets, which leave non-wetted areas between the droplets.

Although this disclosure has described and illustrated certain preferred embodiments of the invention, it is to be understood that the invention is not restricted to those particular embodiments. Rather the invention includes all embodiments which are functional or mechanical equivalents of the specific embodiments and features that have been described and illustrated.

What is claimed is:

1. A field management method for growing cash crops susceptible to interference by noxious weeds comprising
   (I) forming planting beds of soil,
   (ii) performing soil solarization by covering all said planting beds of soil with a transparent IR retentive film for a soil solarization period of time, prior to planting a cash crop, to kill or suppress noxious weed growth by soil solarization,
   (iii) painting said thermoplastic film to terminate said soil solarization, and
   (iv) transplanting said cash crop.

2. A method as defined in claim 1 comprising
   (v) subjecting said soil according to step (ii) for a period selected from 6–8 weeks; and
   (vi) painting said film after step (ii) with a paint to prevent visible light transmission for a period of at least 3 hours, prior to step (iv).

3. A method as defined in claim 1 wherein said noxious weed is nutsedge (Cyperus spp).

4. A method as defined in claim 1 wherein said cash crop is selected from strawberries and tomatoes.

* * * * *